Figure 1:
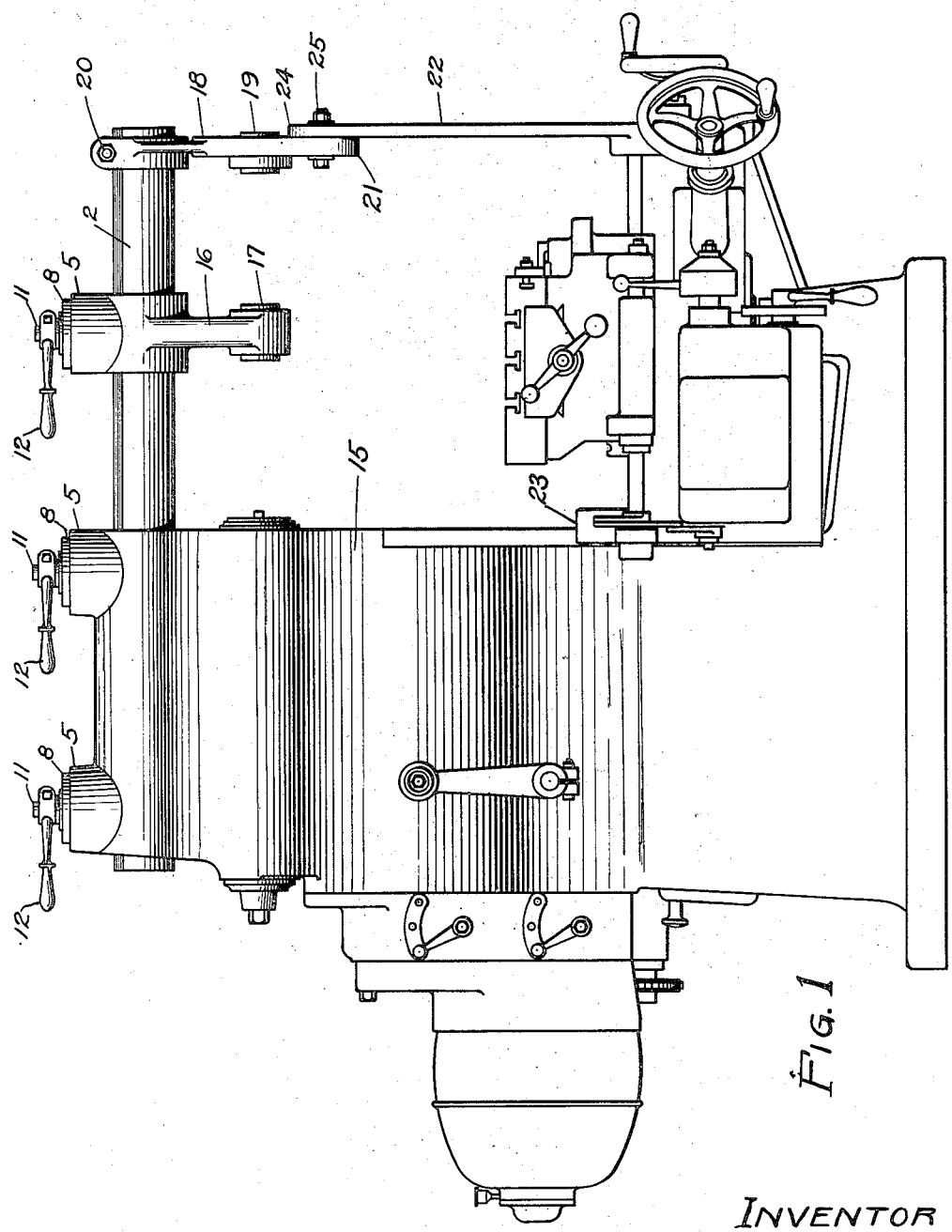

May 20, 1924.  1,494,340

C. M. CONRADSON

OVERARM FOR MILLING MACHINES

Filed Aug. 29, 1921   2 Sheets-Sheet 1

INVENTOR
CONRAD M. CONRADSON
By Paul Paul
ATTORNEYS

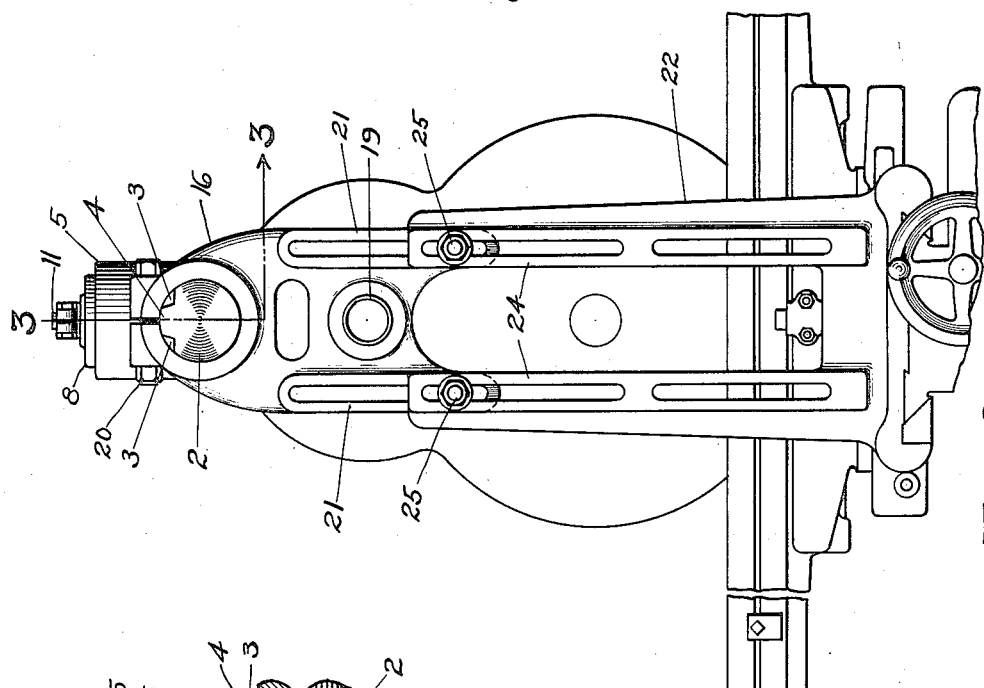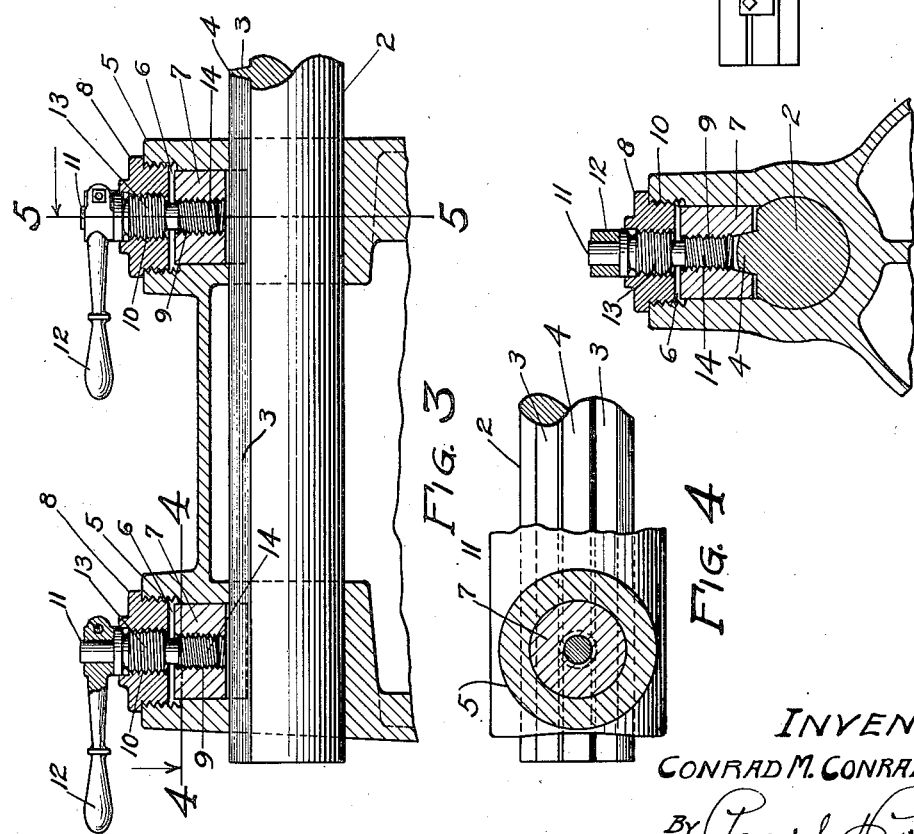

Patented May 20, 1924.

1,494,340

UNITED STATES PATENT OFFICE.

CONRAD M. CONRADSON, OF GREEN BAY, WISCONSIN, ASSIGNOR TO JOSEPH T. RYERSON & SON, OF CHICAGO, ILLINOIS, A CORPORATION OF ILLINOIS.

OVERARM FOR MILLING MACHINES.

Application filed August 29, 1921. Serial No. 496,336.

*To all whom it may concern:*

Be it known that I, CONRAD M. CONRADSON, a citizen of the United States, resident of Green Bay, county of Brown, State of Wisconsin, have invented certain new and useful Improvements in Overarms for Milling Machines, of which the following is a specification.

The object of my invention is to provide improved means for rigidly holding the overhanging bearings in which the outer end of the cutting arbor is supported against both sliding and swinging movement and at the same time permitting longitudinal adjustment of the arbor bearings and the overarm upon which the arbor bearings are supported.

The invention consists generally in various constructions and combinations, all as hereinafter described and particularly pointed out in the claims.

In the accompanying drawings forming part of this specification,

Figure 1 is a side elevation of a milling machine with my invention applied thereto, Figure 2 is an end elevation of the upper portion of the machine, Figure 3 is a detail sectional view on the line 3—3 of Figure 2, Figure 4 is a sectional view on the line 4—4 of Figure 3, Figure 5 is a sectional view on the line 5—5 of Figure 3.

In the drawings, 2 represents a rigid circular steel overarm bar having two longitudinal grooves 3 forming a tapered spline 4. This bar is accurately fitted and mounted in bored out openings in the housing 5. Sockets 6 at right angles to the bore of the housing 5 are provided with clamping blocks 7. These blocks have tapered grooves fitting the tapered spline 4 of the overarm bar. Internally and externally threaded caps 8 are provided, screwed into the socket 6 and the clamping blocks 7 are provided with internal screw threads 9 concentric with the internal screw threads 10 of the caps 8, but of slightly different pitch. Clamping bolts 11 have lever handles 12 and differential threads 13 and 14 fitting the threads 9 and 10 and are screwed into the blocks 7 and the caps 8 to force the tapered walls of the blocks 7 against the tapered spline 4. The result of this construction is that with comparatively coarse pitched threads having great strength, the clamping action of the screw threads may be almost indefinitely increased, the forward travel of the clamping blocks 7 being determined by the difference in the pitch or helix of the threads, which may be very slight. The very rigid connection of the overarm bar 2 with the main supporting column 15 of the machine to prevent both longitudinal and turning movement of the bar, is thus secured in a very simple and effective manner.

The arm 16 having the arbor bearing 17 is clamped to the bar 2 by the above described method for clamping the bar to the frame and the same reference numerals are applied to corresponding parts. The bracket 18 having the outer arbor bearing 19 is preferably secured to the bar 2 by a clamping bolt 20 and is also provided with depending vertically slotted arms 21. A brace 22 is slidably mounted on the knee frame 23 and its slotted vertical arms 24 are adjustably clamped to the arms 21 by clamping bolts 25. This construction adds materially to the rigidity and strength of the bar 2, particularly as regards forces acting in a vertical direction.

I claim as my invention:

1. The combination, with a column, of an overarm seated therein and provided with longitudinal grooves forming a central spline and locking means engaging said spline for securing said overarm.

2. The combination, with a column and an overarm seated therein and provided with longitudinal grooves forming a spline between them, said spline having inclined or tapered surfaces and blocks having recesses to receive said spline and engaging said surfaces upon each side of said spline for rigidly securing said arm in said column.

3. The combination, with a column having a housing, of an overarm horizontally mounted therein, a block vertically mounted in said housing, a cap mounted in said housing above said block, said block and cap having threaded openings therein, said block having the smaller opening, and a screw having threads of different pitch for fitting said openings for clamping said block against said arm.

In witness whereof, I have hereunto set my hand this 26th day of August 1921.

CONRAD M. CONRADSON.